UNITED STATES PATENT OFFICE.

RENÉ BOHN, OF MANNHEIM, GERMANY, ASSIGNOR TO BADISCHE ANILIN & SODA FABRIK, OF LUDWIGSHAFEN-ON-THE-RHINE, GERMANY, A CORPORATION OF BADEN.

NAPHTHALENE DYE AND PROCESS OF MAKING SAME.

No. 806,053.     Specification of Letters Patent.     Patented Nov. 28, 1905.

Application filed August 19, 1905. Serial No. 274,907.

*To all whom it may concern:*

Be it known that I, RENÉ BOHN, doctor of philosophy and chemist, a citizen of the Swiss Republic, residing at Mannheim, in the Grand Duchy of Baden, German Empire, have invented new and useful Improvements in Naphthalene Dyes and Processes of Making the Same, of which the following is a specification.

My invention consists in the manufacture and production of new coloring-matter from naphthazarin. I have discovered that when one molecular proportion of napthazarin is heated in aqueous solution with more than two molecular proportions of caustic soda, preferably while passing air through the mixture, the solution which is at first of a corn-flower-blue color changes gradually into a fuchsin-red and contains a new coloring-matter, and by the addition of acid to the said solution this new coloring-matter is precipitated as a brown crystalline precipitate. If less than two molecular proportions of caustic soda be employed, different color changes are observed, and the result is not that contemplated according to my invention.

The new coloring-matter is easily soluble in most ordinary solvents and can be obtained in a pure form by crystallization from water or from benzene. When crystallized from benzene, the coloring-matter can be obtained in the form of red needles, which possess the following characteristic reactions: solution in water, orange-red; solution in sodium-carbonate solution, blood-red; solution in caustic-soda solution, purple-red; solution in concentrated sulfuric acid, fuchsin-red; solution in nitrobenzene, orange-red; solution in glacial acetic acid, orange.

The new coloring-matter dyes wool, from an acetic-acid bath, orange-red shades, which upon treatment with a bichromate are converted into reddish-black shades. When the new coloring-matter is printed with chromium acetate onto cotton, a very fast full black is obtained of greater beauty than the shades obtained similarly with naphthazarin.

The following example illustrates how the new coloring-matter can be obtained in practice; but my invention is not limited to this example. The parts are by weight. Boil together ten (10) parts of a fifty (50) per cent. naphthazarin paste, five hundred (500) parts of water, and twenty-two (22) parts of caustic-soda solution, (containing about twenty-four (24) per cent. of NaOH,) preferably while passing a current of air through the solution, until the coloring of the same has become fuchsin-red. This is generally the case in about from three (3) to four (4) hours. When the mixture has cooled, precipitate the new coloring-matter by means of sulfuric acid and filter off and wash.

By treatment with sodium bisulfite the new coloring-matter can be converted into a soluble compound.

Now what I claim is—

1. The process for the production of coloring-matter of the naphthalene series by heating naphthazarin in aqueous solution with more than two molecular proportions of caustic soda.

2. The process for the production of coloring-matter of the naphthalene series by heating naphthazarin in aqueous solution with more than two molecular proportions of caustic soda and treating the product obtained with sodium bisulfite.

3. As a new article of manufacture the coloring-matter which can be derived from naphthazarin, which coloring-matter is soluble in water and which in the form of its bisulfite compound is more easily soluble in water and which can be recrystallized from benzene and thus be obtained in the form of red needles which are soluble in sulfuric acid with a fuchsin-red color and in nitrobenzene with an orange-red color and which dye wool from an acetic-acid bath orange-red shades which upon treatment with a bichromate are converted into reddish-black shades.

In testimony whereof I have hereunto set my hand in the presence of two subscribing witnesses.

RENÉ BOHN.

Witnesses:
    ERNEST F. EHRHARDT,
    H. W. HARRIS.